Patented Nov. 5, 1929

1,734,259

UNITED STATES PATENT OFFICE

FRIEDRICH KRECKE, OF OFFENBACH, NEAR FRANKFORT-ON-THE-MAIN, GERMANY, ASSIGNOR TO GENERAL ANILINE WORKS, INC., OF NEW YORK, N. Y., A CORPORATION OF DELAWARE

2-HYDROXYNAPHTHALENE-8-MONOSULFO-6-CARBOXYLIC ACID AND PROCESS OF MAKING IT

No Drawing. Application filed March 26, 1928, Serial No. 264,977, and in Germany March 30, 1927.

My invention relates to a new 2-hydroxynaphthalene-6-carboxymonosulfonic acid having probably the formula:

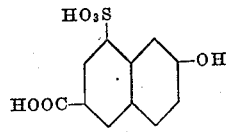

which acid is obtained by acting with concentrated sulfuric acid advantageously at temperatures ranging from 50 to 80° and separating the plurality of monosulfonic acids thus formed by taking advantage of the different solubility of their neutral alkali metal salts.

The new 2-hydroxynaphthalene-8-sulfo-6-carboxylic acid is when dry a colorless powder, it does not combine in a dilute sodium carbonate solution with diazocompounds of a low capacity for combining, such as diazotized aniline or diazotized para-toluidine, it is characterized by a strong blue fluorescence of its solutions in strong sodium carbonate solutions and its sparingly soluble acid magnesium salt, the acid sodium salt crystallizes in fine needles from hot water. It may be used as intermediate for the production of dyestuffs.

The following example will further illustrate my invention, the parts being by weight and all temperatures in centigrade degrees, but it is understood, that my invention is not limited to the particular proportions, reacting conditions or materials listed therein.

Example.—400 parts of 2-hydroxynaphthalene-6-carboxylic acid are slowly introduced at 40-50° in 1350 parts of sulfuric acid of 66° Bé. Then the mixture is stirred for some hours while slowly increasing the temperature to 80°. The mass is poured on ice and the acid sodium salts of the formed sulfonic acids are separated by adding common salt, then the mixture of these salts is converted into the corresponding neutral salts by treatment with sodium carbonate and the neutral solution therefrom is evaporated until a crystalline separation begins. After cooling down the neutral disodium salt of 2-hydroxynaphthalene-3-monosulfo-6-carboxylic acid separates almost entirely in compact needles. From the filtrate the 2-hydroxynaphthalene-8-monosulfo-6-carboxylic acid may be obtained by adding hydrochloric acid.

I claim:

1. As a new compound a 2-hydroxynaphthalene-6-carboxy-monosulfonic acid having probably the formula:

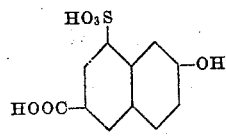

which acid is when dry a colorless powder, which does not combine in a dilute sodium carbonate solution with diazocompounds of a low capacity for combining, which is characterized by a strong blue fluorescence of its solutions in strong sodium carbonate solutions and its sparingly soluble acid magnesium salt, the acid sodium salt of which crystallizes in fine needles from hot water.

2. A process for producing a new 2-hydroxynaphthalene-6-carboxymonosulfonic acid having probably the formula:

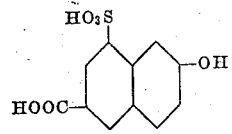

which process comprises acting with concentrated sulfuric acid at temperatures ranging from about 50 to 80° on 2-hydroxynaphthalene-6-carboxylic acid and separating the 2-hydroxy-naphthalene-6-carboxy-monosulfonic acid from the plurality of monosulfonic acids formed by taking advantage of the different solubility of their neutral alkali metal salts.

In testimony whereof, I affix my signature.

FRIEDRICH KRECKE.